Patented Mar. 28, 1939

2,151,933

UNITED STATES PATENT OFFICE 2,151,933

METHOD OF FORMING A CUPROUS OXIDE RECTIFIER ELEMENT

Mitsuo Ono, Mita, Shibaku, Tokyo, Japan, assignor to International Standard Electric Corporation, New York, N. Y., a corporation of Delaware No Drawing. Application March 19, 1937, Serial No. 131,782. In Japan April 27, 1936

9 Claims. (Cl. 175—366)

This invention relates to a method of forming a cuprous oxide rectifier element, which comprises introducing the rectifier element which has cuprous oxide formed thereon by heat treatment into a bath of molten fluoride such as barium fluoride, calcium fluoride or a mixture of such a fluoride with other material, and thereafter removing the element coated with such fluoride and cooling said coated element. Its object is to prevent the production of a detrimental black oxide of copper in the formation of a cuprous oxide upon the surface of a rectifier element.

The black copper oxide which is produced upon the surface of cuprous oxide in the manufacture of cuprous oxide rectifier elements is high in electric resistance and hence it has a detrimental influence and causes the rectification ratio to decrease. It is therefore desirable to prevent the production therof as far as possible.

After observing the condition of formation of cuprous oxide in a furnace, I have learned that up to the temperature of about 1020° C., the surface of a rectifier element is covered with black copper oxide but that at temperatures above 1030° C., said black copper oxide is decomposed into cuprous oxide and oxygen so that the rectifier element is caused to be covered only with the cuprous oxide. And, I have found that when the cuprous oxide thus formed is again brought into contact with the air at a temperature below 1020° C., the cuprous oxide becomes oxidized so that its surface changes again into the black copper oxide. In order to prevent the formation of such black copper oxide, it is proposed to cut off the contact of air against said rectifier element while said cuprous oxide is cooled down from the temperature above 1030° C. at which it has been formed.

According to my invention a harmless medium which is able to maintain a good melting condition in the neighborhood of about 1030° C. is placed into a furnace, the temperature of said furnace being above 1030° C. and after the formation of a cuprous oxide upon the surface of a rectifier element, such element is introduced into said medium and thereafter taken out and cooled down. For such medium, a fluoride composition such as barium fluoride, calcium fluoride or a mixture of such a fluoride composition with other material which does not vaporize even at the temperature of about 1030° C. and which is adapted to maintain the liquid condition is suitable. It will be noted that I use the expression "fluoride composition" to designate generally a composition of which substantially all the molecules include the fluoride radical whether the complementary radicals of the molecules are alike or various. This terminology is chosen because the expression fluoride compound is conventionally understood to refer only to a single chemical compound including the fluoride radical whereas the expression "fluoride mixture" might be understood to refer only to a physical mixture of different chemical compounds.

For instance, the mixture of one mol of barium fluoride and one mol of barium chloride melts at about 1020° C. and does not vaporize even if it is raised to more than 1030° C. Thus if this mixture is melted in a furnace and copper pieces on which cuprous oxide has been formed are introduced into the molten mixture and thereafter removed and cooled, the surface of said copper pieces has said mixture of chloride and fluoride solidified and coated thereupon, thereby preventing the oxidation of the copper sheet and the production of the black copper oxide. Finally of course, the solidified mixture may be removed.

What is claimed is:

1. The method of treating a hot copper rectifier blank which is coated with cuprous oxide, which comprises dipping said hot blank into a molten bath comprising a substantial proportion of fluoride composition which is principally composed of the fluoride radical combined with at least one of the metals from the group consisting of barium and calcium at a temperature substantally as high as 1030° C., removing said blank from said bath so as to leave an adherent coating of said fluoride composition thereon, cooling said blank, and thereafter removing said composition therefrom.

2. The method of treating a hot copper rectifier blank which is coated with cuprous oxide, which comprises covering said hot blank with an adherent coating of molten material comprising a substantial proportion of fluoride composition which is principally composed of the fluoride radical combined with at least one of the metals from the group consisting of barium and calcium at a temperature substantially as high as 1030° C., cooling said blank, and thereafter removing said composition therefrom.

3. The method of forming a cuprous-oxide type rectifier element which comprises heat-treating a copper blank at an elevated temperature so high as to promote the formation of cuprous oxide and inhibit the formation of cupric oxide so as to form a layer of cuprous oxide on said blank, subsequently coating said blank at said elevated temperature with a closely adherent coating of a molten medium comprising a substantial proportion of fluoride composition, subsequently cooling said coated blank from said elevated temperature to a lower temperature at which said layer of cuprous oxide is stable, and thereafter removing said coating.

4. The method of forming a cuprous-oxide type rectifier element which comprises heat-treating a copper blank at a temperature higher than about 1030° centigrade so as to form a layer of cuprous oxide on said blank, subsequently coating said blank at a temperature higher than about 1020° centigrade with a closely adherent coating of a molten medium comprising a substantial proportion of fluoride composition, subsequently cooling said coated blank from said last named temperature to a lower temperature at which said layer of cuprous oxide is stable, and thereafter removing said coating.

5. The method of forming a cuprous oxide rectifier element from a copper blank, which comprises heat treating the blank at a temperature so high as to form a layer of cuprous oxide free from cupric oxide on said blank, then introducing the heat treated blank while at a temperature above 1020° C. into a molten medium comprising a substantial proportion of fluoride composition and thereafter cooling said blank while covered with an adherent coating of said medium.

6. The method of forming a cuprous oxide rectifier element from a copper blank, which comprises heat treating the blank at a temperature so high as to form a layer of cuprous oxide free from cupric oxide on said blank, then introducing the heat treated blank while at a temperature above 1020° C. into a molten medium comprising a substantial proportion of fluoride composition which predominantly consists of the fluoride radical combined with at least one of the metals of the group consisting of barium and calcium and thereafter cooling said blank while covered with an adherent coating of said medium.

7. The method of forming a cuprous oxide rectifier element from a copper blank, which comprises heat treating the blank at a temperature so high as to form a layer of cuprous oxide free from cupric oxide on said blank, then introducing the heat treated blank while at a temperature above 1020° C. into a molten medium comprising a substantial proportion of fluoride composition which predominantly consists of calcium fluoride and thereafter cooling said blank while covered with an adherent coating of said medium.

8. The method of forming a cuprous oxide rectifier element from a copper blank, which comprises heat treating the blank at a temperature so high as to form a layer of cuprous oxide free from cupric oxide on said blank, then introducing the heat treated blank while at a temperature above 1020° C. into a molten medium comprising a substantial proportion of fluoride composition which predominantly consists of barium fluoride and thereafter cooling said blank while covered with an adherent coating of said medium.

9. The method of forming a cuprous oxide rectifier element from a copper blank, which comprises heat treating the blank at a temperature so high as to form a layer of cuprous oxide free from cupric oxide on said blank, then introducing the heat treated blank while at a temperature above 1020° C. into a bath of molten medium having a temperature substantially as high as 1050° C., said medium comprising a substantial proportion of fluoride composition and having a melting point below the temperature of said bath and being free from substantial vaporization at the temperature of said bath, and thereafter cooling said blank while covered with an adherent coating of said medium.

MITSUO ONO.